United States Patent
Bradley

(10) Patent No.: US 7,110,042 B1
(45) Date of Patent: Sep. 19, 2006

(54) SYNCHRONIZATION SIGNAL DECODER AND ASSOCIATED METHOD

(75) Inventor: William C. Bradley, Tualatin, OR (US)

(73) Assignee: Pixelworks, Inc., Tualatin, OR (US)

( * ) Notice: Subject to any disclaimer, the term of this patent is extended or adjusted under 35 U.S.C. 154(b) by 508 days.

(21) Appl. No.: 10/291,063

(22) Filed: Nov. 7, 2002

Related U.S. Application Data

(60) Provisional application No. 60/336,970, filed on Nov. 7, 2001.

(51) Int. Cl.
H04N 5/08 (2006.01)

(52) U.S. Cl. .................. 348/534; 348/532; 348/604; 348/607; 348/683; 386/94; 380/201; 360/60

(58) Field of Classification Search ............... 348/534, 348/532, 537, 604, 607, 627, 678, 682–683, 348/691, 697; 386/1, 94; 380/201, 203; 360/60; H04N 5/08
See application file for complete search history.

(56) References Cited

U.S. PATENT DOCUMENTS

| | | | |
|---|---|---|---|
| 4,396,947 A * | 8/1983 | Cheung | 380/222 |
| 4,695,901 A * | 9/1987 | Ryan | 380/204 |
| 4,908,834 A * | 3/1990 | Wiedemer | 380/228 |
| 4,912,691 A * | 3/1990 | Jones | 380/204 |
| 4,951,315 A * | 8/1990 | Switsen | 380/224 |
| 5,194,965 A * | 3/1993 | Quan et al. | 386/94 |
| 5,633,927 A * | 5/1997 | Ryan et al. | 380/204 |
| 5,661,801 A * | 8/1997 | Sperber | 380/204 |
| 5,737,417 A * | 4/1998 | Buynak et al. | 380/204 |
| 6,285,765 B1 * | 9/2001 | Quan | 380/204 |
| 6,421,497 B1 * | 7/2002 | Quan | 386/1 |
| 6,600,873 B1 * | 7/2003 | Brill et al. | 386/94 |
| 6,690,880 B1 * | 2/2004 | Rinaldi | 386/94 |
| 6,836,549 B1 * | 12/2004 | Quan et al. | 380/221 |
| 6,931,547 B1 * | 8/2005 | Quan | 386/94 |

* cited by examiner

*Primary Examiner*—Brian P. Yenke
(74) *Attorney, Agent, or Firm*—Marger Johnson & McCollom P.C.

(57) ABSTRACT

The invention relates to a synchronization signal decoder and associated method for improving digital image display. A composite video stream includes a distortion compliant signal and a synchronization signal. A level shift circuit is adapted to shift a voltage level of the composite video stream such that the distortion compliant signal is readily distinguishable from the synchronization signal. A level shift disable circuit is adapted to disable the level shift circuit responsive to the composite video stream.

20 Claims, 4 Drawing Sheets

SYNCHRONIZATION SIGNAL DECODER AND ASSOCIATED METHOD

This application claims priority from U.S. provisional patent application Ser. No. 60/336,970, filed Nov. 7, 2001, incorporated herein by reference.

BACKGROUND OF THE INVENTION

1. Field of the Invention

The invention relates to a synchronization signal decoder and associated method.

2. Description of the Related Art

The National Television System Committee (NTSC) is responsible for setting television and video standards in the United States and other parts of the world. The NTSC television standard defines a composite video signal with a refresh rate of 60 half frames (interlaced) per second. Each frame contains 525 lines and up to 16 million different colors. The standard uses only about 480 of these lines to transmit video information. It uses the additional 45 lines to carry control codes (such as interlace information), closed captions, and other similar non-video content. Many companies add distortion or scrambling signals to some or all of these 45 additional lines to prevent unauthorized copying of copyright protected works. One such company is Macrovision® Inc., a Delaware corporation, whose protection signals carry the same name.

Macrovision® copy prevention works by adding predetermined synchronization and content signals (collectively distortion signals) to these additional lines prior to mass distribution. Automatic Gain Control (AGC) circuits included in most recording equipment scramble the video signal responsive to the distortion signals when a user attempts to copy protected media. Recording equipment includes videocassette recorders (VCRs) and the like. Images copied without authorization from Macrovision®-encoded source material will frequently exhibit image distortion including color loss, image tearing, variable brightness, and picture instability.

Put differently, the additional distortion signals are designed to make recording equipment, such as a VCR, malfunction if it attempts to record protected material. Recording equipment typically locks on to the incoming video's synchronization signals to ensure proper alignment. But the distortion signals include about 32 "illegal" synchronization signals in the non-viewable area of the picture that confuse the equipment and result in a misaligned and distorted image.

Distortion signals do not interfere with most older televisions that are capable of distinguishing distortion signals from other synchronization signals. But more sophisticated, typically newer, televisions and other digital pixelated displays—e.g., liquid crystal display (LCD) projector, flat panel monitor, plasma display (PDP), field emissive display (FED), electro-luminescent (EL) display, micro-mirror technology display, and the like—often malfunction because of the distortion signals. This is in part due to technology in newer sets and displays that use synchronization signals to further process the images to be displayed. If the technology is unable to parse the distortion signals from the incoming synchronization signals, the image will not be properly display on the set's screen. For properly displaying and processing images, then, the issue is distinguishing the distortion signals from other synchronization signals in a composite video signal stream without causing unacceptable timing deterioration or loss of logical meaning.

Previous attempts at distortion signal parsing center on gating techniques inserted into the signal stream. These gating techniques operate to alter the timing of the signals and often result in greater circuit complexity. Other approaches include using phase locked loops that are susceptible to noise and require precise and expensive components Accordingly, a need remains for an improved circuit capable of distinguishing distortion signals other from synchronization signals in image processing applications.

BRIEF DESCRIPTION OF THE DRAWINGS

The foregoing and other objects, features, and advantages of the invention will become more readily apparent from the detailed description of an embodiment that references the following drawings.

DETAILED DESCRIPTION OF THE PREFERRED EMBODIMENT

Figure 1:
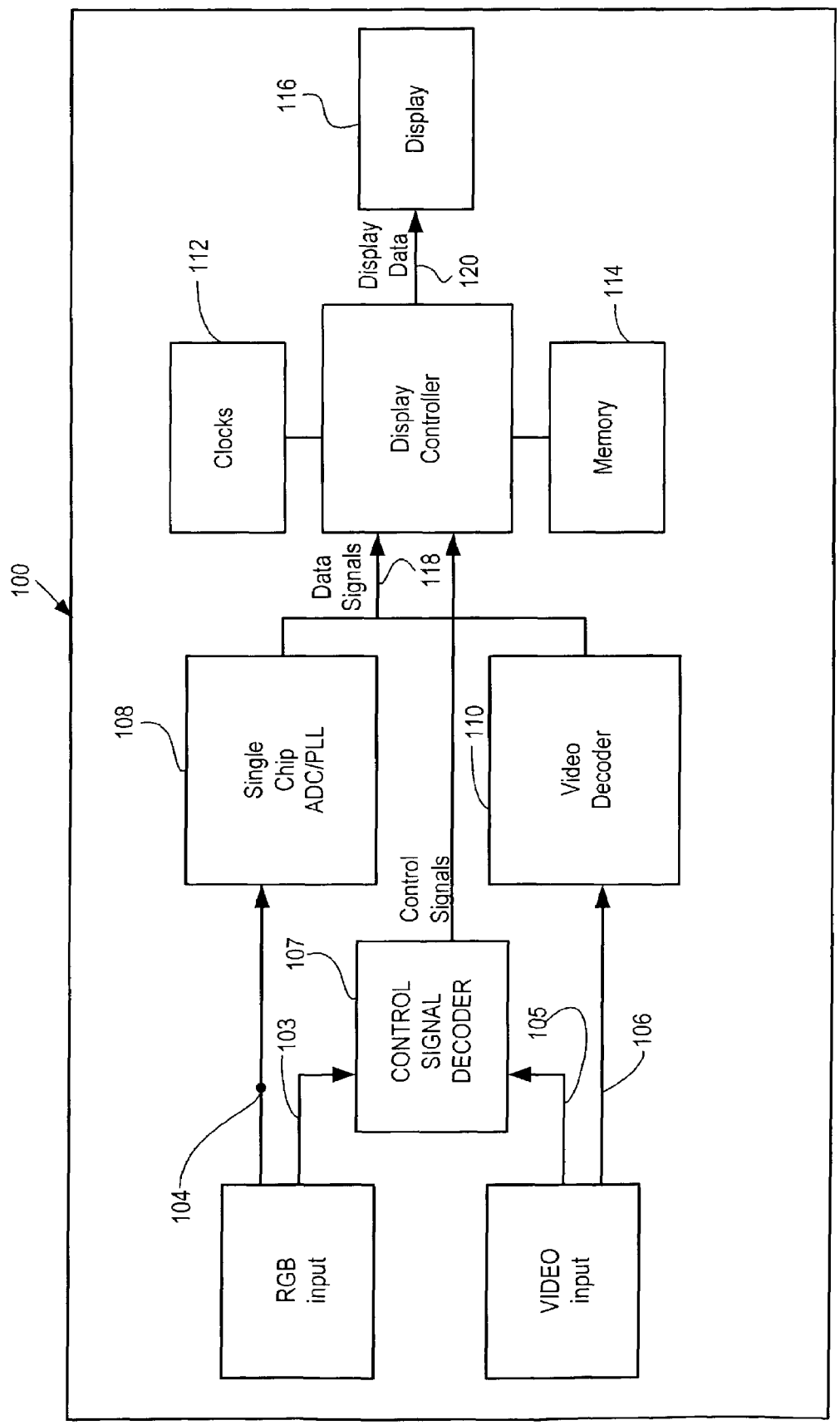
FIG. 1 is a block diagram of an embodiment of the system of the present invention.

Referring to FIG. 1, an embodiment of a system 100 for visually displaying digital images includes an analog-to-digital converter (ADC) or phase locked loop (PLL) circuit 108 for receiving an RGB analog input data signal 104 from an image source (not shown). The ADC/PLL circuit 108 converts the analog input data signal 104 to digital image data 118 and provides the image data 118 to the display controller 102. Likewise, a video decoder 110 receives an analog video data input 106 from an analog video source (not shown). The video decoder 110 converts the analog video data input to digital image data 118 and provides the image data 118 to the display controller 102. A person of reasonable skill in the art should recognize that the image data 118 might be encoded in a variety of formats. All manner of encoding a digital image comes within the scope of the invention including RGB signals using 8, 6, or 4-bit luminance, red chroma, blue chroma ($YC_rC_b$), and the like.

A control signal decoder 107 decodes the RGB control signals 103 and video control signals 105. The RGB control signals 103 and video control signals 105 include the control signals necessary for the display of the digital image. These control signals include vertical and horizontal synchronization signals. A person of reasonable skill in the art should recognize that the vertical and horizontal synchronization signals are often combined into a single composite video stream or into one of the RGB signals, e.g., the green signal. The vertical and horizontal synchronization signals are also often combined with the distortion signals. In one embodiment, the decoder 110 processes a composite video stream to parse the horizontal and vertical synchronization signals from the distortion signals before the former are provided to the display controller 102.

A person of reasonable skill in the art should recognize that the control signal decoder 107 might be a stand-alone circuit or integrated with display controller 102, ADC/PLL 108, video decoder 110, or any other circuitry included in the display 116.

Display controller 102 processes image data and control signals 118 to generate display data 120. Display controller 102 provides the display data 120 to the display 116. Clocks 112 synchronize the display controller 102. The system 100 optionally includes memory 114. Memory 114 couples to the display controller 102 and stores bitmaps, scalar coefficients, and the like. In one embodiment, memory 102 includes read-only and random access type memories (not shown). ADC/PLL circuit 108, video decoder circuit 110, clocks 112, and memory 114 are well known to a person of reasonable skill in the art and will not be explained in further detail. The system 100, including the display controller 102 and decoder 107, might be included with the display 116.

The display 116 is any device capable of displaying data 120. The data 120 might, for example, be encoded in RGB signals (not shown) but the invention is not limited in this regard. The display 116 might be, for example, a pixelated display that has a fixed pixel structure. Examples of pixelated displays are a liquid crystal display (LCD) projector, flat panel (LCD) monitor, plasma display (PDP), field emissive display (FED), electro-luminescent (EL) display, micro-mirror technology display, and the like.

Figure 2:
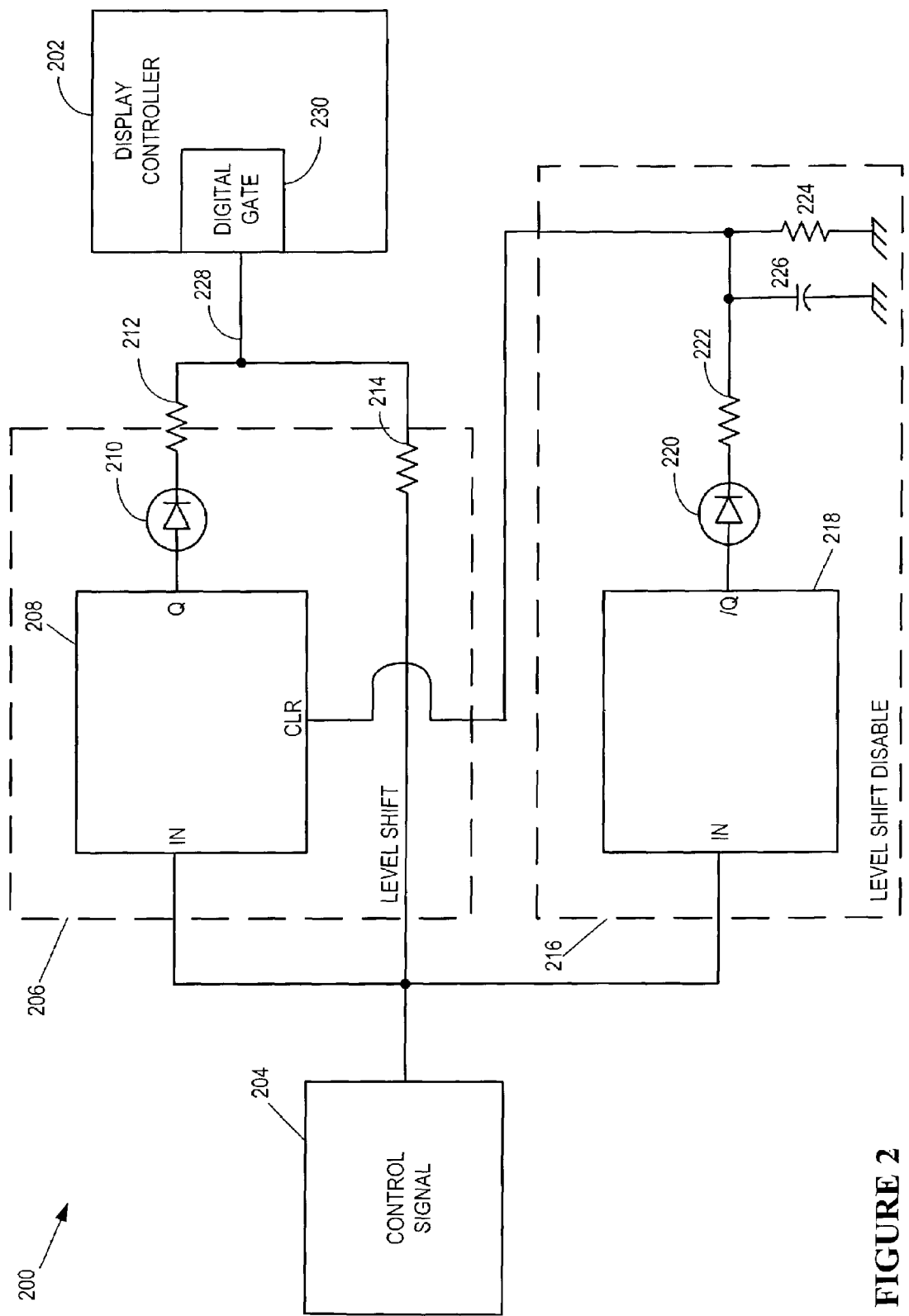
FIG. 2 is a block diagram of the present invention.

FIG. 2 is a block diagram of the decoder of the present invention. Referring to FIG. 2, a decoder 200 receives a control signal 204. The control signal 204 might include the vertical and horizontal synchronization signals as well as the distortion signals. The control signal 204 might a composite video stream where the vertical and horizontal synchronization signals are combined to one another as well as with the Distortion signals. The control signal 204 might also be part of the RGB signals 103 shown in FIG. 1 where the vertical and horizontal synchronization signals are oftentimes provided on the green signal together with the distortion signals.

A level shift circuit 206 shifts a voltage level of the control signal 202. The level shift circuit 206 includes a one-shot circuit 208, a diode 210, and resistors 212 and 214. The level shift circuit 206 generates a synchronization signal 228 it provides to display controller 202. More particularly, the level shift circuit 206 provides the synchronization signal 228 to digital gate 230. The display controller 202 processes image data (provided separately as shown in FIG. 1) for proper display on the display 116 (FIG. 1) responsive to the synchronization signal 228.

A level shift disable circuit 216 disables the level shift circuit 206. The level shift disable circuit 216 includes a one-shot circuit 218, a diode 220, capacitor 226, and resistors 222 and 224.

Figure 3:
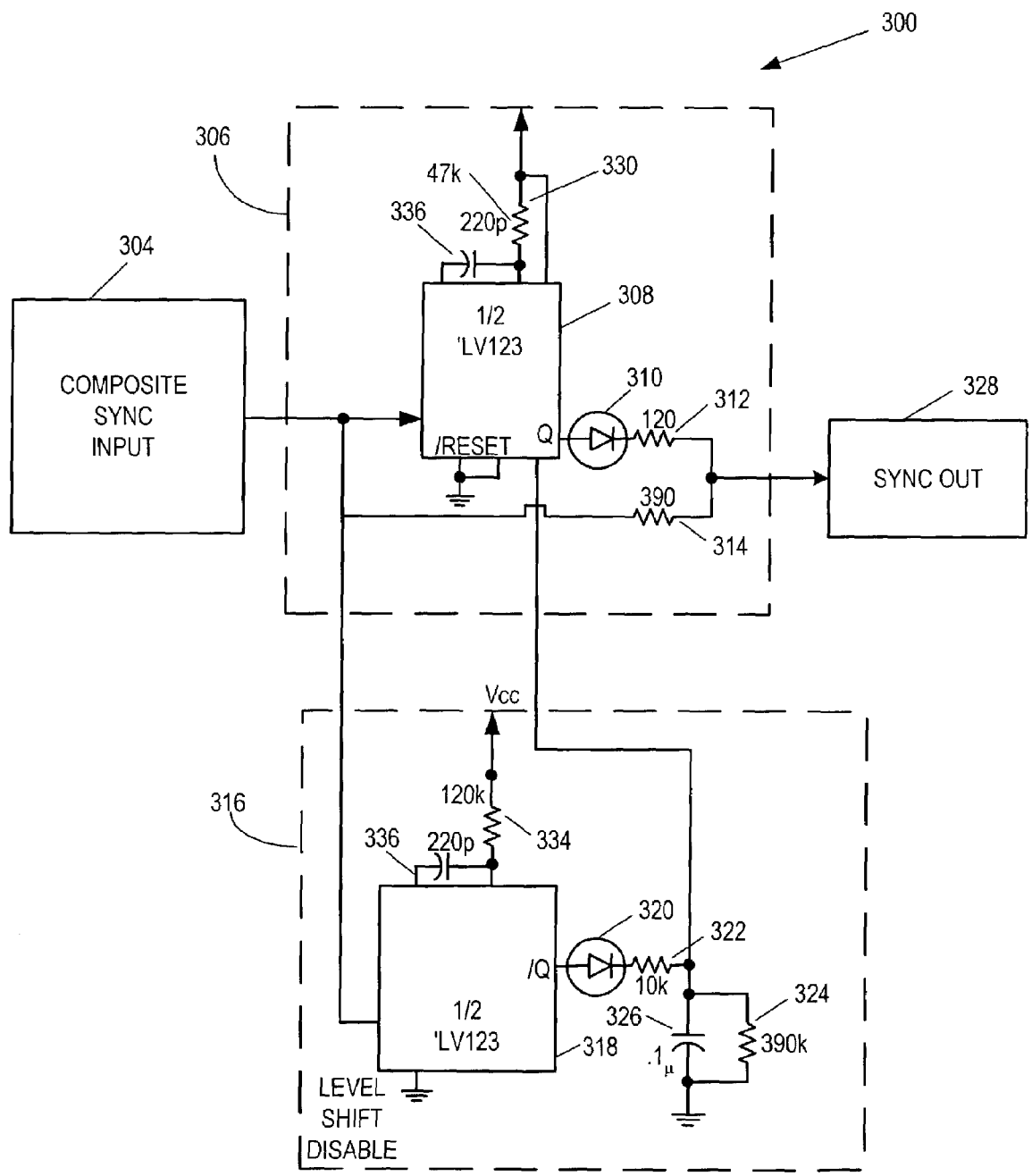
FIG. 3 is a circuit diagram of the present invention.

FIG. 3 is a circuit diagram of an embodiment of the decoder 200 (FIG. 2). Referring to FIG. 3, the decoder 300 includes a level shift circuit 306 and a level shift disable circuit 316. The level shift circuit 306 includes a one-shot circuit 308 implemented as one half of a monostable re-triggerable multivibrator, e.g., Texas Instruments 74LV123. The one-shot circuit 308 receives a composite synchronization control signal 304 including the vertical and horizontal synchronization signals as well as the distortion signals as mentioned above. The one-shot 308 is coupled, at its Q output, to a diode 310 serially connected to a resistor 312, e.g., 120 ohms. Resistor 330 (e.g., 47 kilo ohms) and capacitor 332 (e.g., 220 Pico farads) bias the one-shot circuit 306 to power supply VCC. One end of resistor 314 is coupled to one end of resistor 312. The other end of resistor 314 receives the composite synchronization signal 304. The level shift circuit 306 generates the synchronization signal 328.

The level shift disable circuit 316 generates the /RESET signal 338 to disable the level shift circuit 306. The level shift disable circuit 316 includes a one-shot circuit implemented, e.g., as the other half of the monostable re-triggerable multivibrator, e.g., Texas Instruments 74LV123. The one-shot disable circuit 316 receives the composite synchronization control signal 304. The one-shot 316 is coupled, at its Q output, to a diode 320 serially connected to a resistor 322 (e.g., 10 kilo ohms). Resistor 334 (e.g., 120 kilo ohms) and capacitor 336 (e.g., 220 Pico farads) bias the one-shot circuit 316 to the power supply VCC. Capacitor 326 (e.g., 0.1 microfarads) is connected in parallel with resistor 324 (e.g., 390 kilo ohms) and between one end of resistor 322 and ground as shown in FIG. 3. The level shift and level shift disable circuits 306 and 316, respectively, might be implemented with counters instead of monostable multivibrators. A person of reasonable skill in the art should recognize that the decoder 300 (or decoder 200 shown in FIG. 2) might be implemented in a variety of manners including software, firmware, hardware, and the like.

Figure 4:
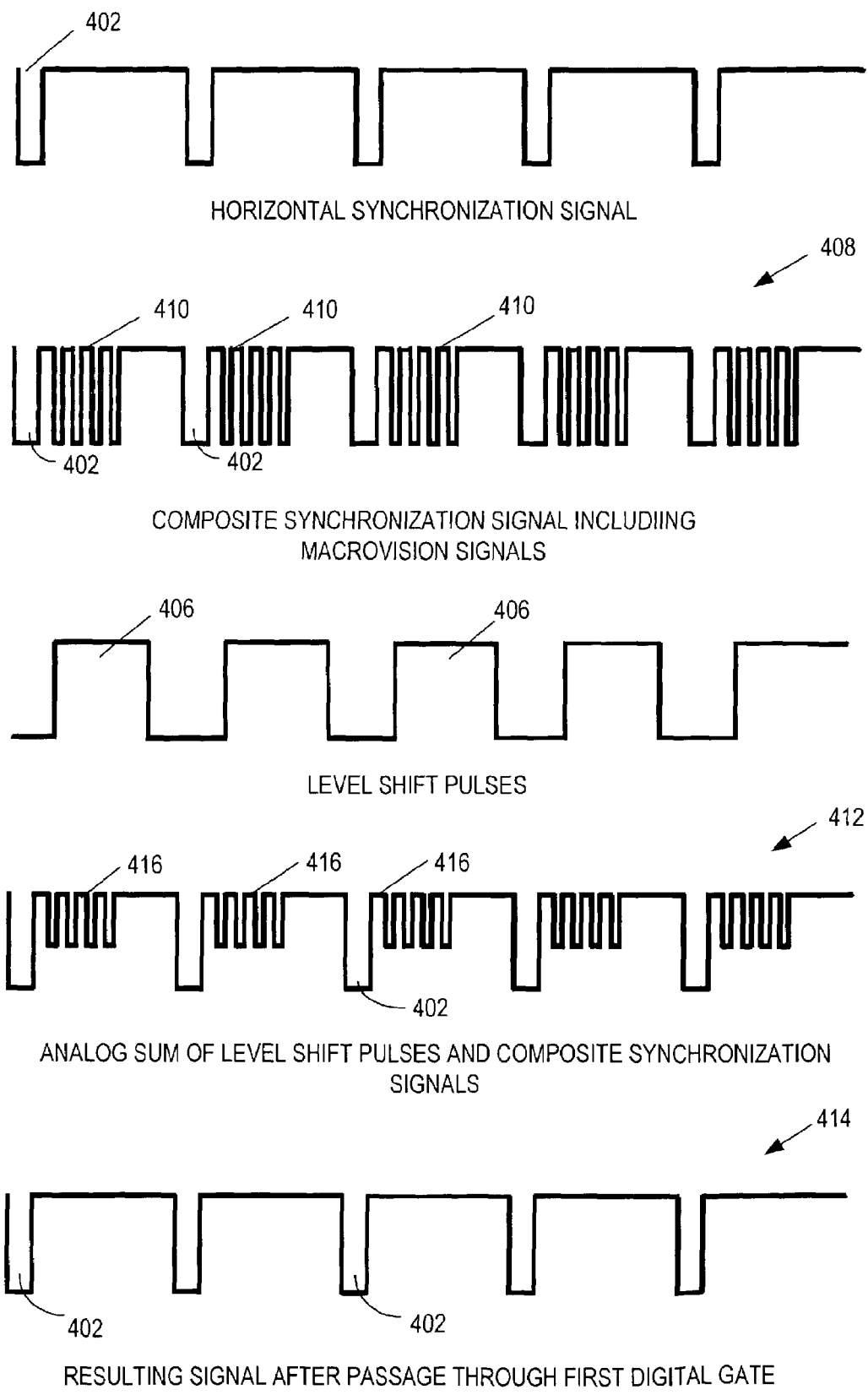
FIG. 4 is a timing diagram of signals associated with the present invention.

The decoders 200 and 300 shown in FIGS. 2 and 3 operate as follows. Referring to FIGS. 2-4, a horizontal synchronization signal is shown separately at 402. A composite synchronization signal 408 includes the horizontal synchronization signal 402 together with a plurality of closely spaced distortion pulses 410. The burst of distortion pulses 410 follows the rising edge of the horizontal synchronization signal 402. The one-shot circuit 308 receives the composite synchronization signal 408 and generates a plurality of pulses 406. The width of each pulse is determined by the value of the resistor 330 and the capacitor 332 in the one-shot 306. The diode 310 ensures that only positive excursions of the plurality of pulses 406 output from the one-shot circuit 308 influence the composite synchronization signal 408. The plurality of pulses 406 sums, in analog form, to the composite synchronization signal 408 through the resistors 312 and 314 (FIG. 3). The resultant signal is shown at 412 where the horizontal synchronization signal 402 remains intact while the distortion pulses 416 are voltage level shifted by the effect of the plurality of pulses 406. By doing so, a first gate 230 (FIG. 2) can easily discriminate between the shifted distortion signals 416 and the horizontal synchronization signals as shown at 414.

Composite synchronization signals, such as signal 408, can vary between many time extremes. This requires that the level shift circuit 306 be disabled under certain circumstances including where the spacing of the horizontal synchronization pulses 402 begins to approximate the spacing of the plurality of distortion pulses 410. The level shift disable circuit 316 generates a /RESET signal 338 that, when active, resets or clears the level shift circuit 306. This allows the composite synchronization signal 304 to pass through the decoder 300 without modification. In one embodiment, the one-shot 316 is designed to generate a /RESET signal 338 having a width that extends beyond the period of the horizontal synchronization signal 402 by about half of an NTSC synchronization interval (63 microseconds). The one-shot circuit 316 retriggers at approximately 30 microsecond intervals, integrating through diode 320 into capacitor 326. When NTSC rates are used, the /RESET signal 338 will charge the capacitor 326 to maintain a logic high level and therefore, not reset or clear the one-shot circuit 306. But, when the synchronization signal 402 arrives at e.g., twice the NTSC rate, the output of the one-shot circuit 316 is no longer pulsing high long enough to maintain the charge on capacitor 326. The capacitor 326, then, loses its charge moving the /RESET signal to a logic low level.

Having illustrated and described the principles of our invention, it should be readily apparent to those skilled in the art that the invention can be modified in arrangement and detail without departing from such principles. I claim all modifications coming within the spirit and scope of the accompanying claims.

I claim:

1. A circuit, comprising:
   signal means including a distortion signal and a synchronization signal;
   shift means adapted shift a voltage level of the distortion signal such that the distortion signal is distinguishable from the synchronization signal; and
   shift disable means adapted to disable the shift means;
   wherein the shift disable means comprises:
      a reset signal generating means adapted to generate a reset signal; and
      a diode means adapted to filter the reset signal, the filtered reset signal being provided to the shift means.

2. The circuit of claim 1 wherein the distortion signal includes a plurality of pulses.

3. The circuit of claim 1 wherein the signal means is a composite video stream.

4. The circuit of claim 1 wherein the signal means is a RGB signal.

5. The circuit of claim 1 wherein the shift means comprises:
   a pulse generating means adapted to generate a pulse signal; and
   a diode means adapted to filter the pulse signal.

6. The circuit of claim 1 including a summing means adapted to sum the filtered pulse signal with the signal means.

7. The circuit of claim 1 wherein the pulse generating means is a one-shot circuit.

8. The circuit of claim 1 wherein the reset means is a one-shot circuit.

9. A circuit, comprising:
   a composite video stream including a distortion signal and a synchronization signal;
   a level shift circuit adapted to shift a voltage level of the composite video stream such that the distortion signal is readily distinguishable from the synchronization signal; and
   a level shift disable circuit adapted to disable the level shift circuit responsive to the composite video stream;
   wherein the level shift circuit comprises:
      a first one-shot circuit adapted to generate a pulse signal responsive to the composite video stream; and
      a first diode adapted to pass positive excursions of the pulse signal.

10. The circuit of claim 9
    wherein the distortion signal includes a plurality of pulses; and
    wherein the synchronization signal includes a horizontal and vertical synchronization signal.

11. The circuit of claim 9 wherein the level shift disable circuit comprises:
    a second one-shot circuit adapted to generate a reset pulse responsive to the composite video stream; and
    a second diode adapted to pass positive excursions of the reset pulse, the reset pulse being adapted to reset the first one-shot circuit thereby disabling the level shift circuit.

12. A method comprising:
    receiving a composite video stream, the composite video stream including a distortion signal and a synchronization signal;
    shifting a voltage level of the composite video stream;
    differentiating the distortion signal from the synchronization signal responsive to the voltage level shifted composite video stream; and
    disabling the shifting responsive to the composite video stream;
    wherein the shifting comprises:
       generating a pulse responsive to the composite synchronization signal stream; and
       passing only positive excursions of the pulse; and
    wherein the disabling comprises:
       generating a reset signal responsive to the composite video stream; and
       passing only positive excursions of the reset signal.

13. The method of claim 12 wherein the shifting comprises:
    generating a pulse responsive to the composite synchronization signal stream; and
    passing only positive excursions of the pulse.

14. A circuit comprising:
    a distortion signal;
    a synchronization signal;
    a reset signal;
    a shift circuit to shift a voltage level of the distortion signal such that the distortion signal is distinguishable from the synchronization signal;
    a diode to filter the reset signal; and
    where the filtered reset signal is adapted to reset the shift circuit.

15. The circuit of claim 14 where the distortion signal includes a plurality of pulses.

16. The circuit of claim 14 where the distortion and synchronization signals are part of a composite video stream.

17. The circuit of claim 14 where the distortion and synchronization signals are part of an RGB signal.

18. The circuit of claim 14 where the shift circuit includes:
    a one-shot circuit adapted to generate a pulse signal; and
    a diode means adapted to filter the pulse signal.

19. The circuit of claim 18 including a summing means adapted to sum the filtered pulse signal with the distortion and synchronization signals.

20. A circuit comprising:
    a first one shot circuit to generate a plurality of pulse signals;
    a first diode to filter the pulse signal;
    a summing circuit to generate a sum signal by summing the plurality of pulse signals with a composite synchronization signal including distortion and synchronization signals;
    a gate to discriminate the distortion signal from the synchronization signal responsive to the sum signal;
    a second one shot circuit to generate a reset signal; and
    a second diode to filter the reset signal, where the filtered reset signal is adapted to reset the first one shot circuit.

* * * * *